Feb. 11, 1930.  E. LÜBCKE  1,746,484
VAPOR DISCHARGE TUBE
Filed Oct. 29, 1926
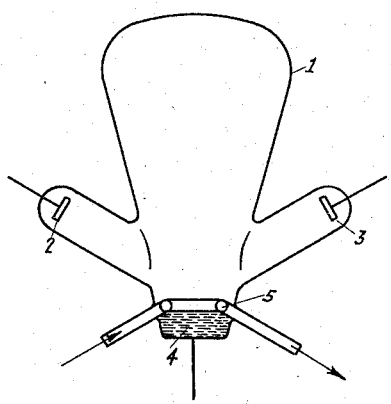
INVENTOR
ERNST LÜBCKE
BY *Ira J. Adams*
ATTORNEY Patented Feb. 11, 1930

1,746,484

UNITED STATES PATENT OFFICE

ERNST LÜBCKE, OF BERLIN-SIEMENSSTADT, GERMANY, ASSIGNOR TO SIEMENS & HALSKE AKTIENGESELLSCHAFT, OF BERLIN-SIEMENSSTADT, GERMANY, A CORPORATION OF GERMANY

VAPOR-DISCHARGE TUBE

Application filed October 29, 1926, Serial No. 145,020, and in Germany September 3, 1925.

The striking of vapor discharge tubes, for instance, mercury-vapor rectifiers and "switch" tubes is attended with great difficulties if the cathode is operated at a low temperature. It has been discovered that impurities of the cathode surface are primarily responsible for and causative of these difficulties.

To rid the surface of the cathode of impurities due to amalgams and the like, a cooling device is provided in the cathode space according to the disclosure of this invention. The amalgams, graphite and metal dust, mica and glass particles, after a short while, are deposited upon the cooling means and form a shiny coat. By means of strong cooling, the vapor pressure of the impurities can be kept very low and will not cause any disturbance to the discharge.

One embodiment of the basic idea of the invention is shown by way of example in the drawing.

Referring to the drawing which forms a part of my disclosure, 1 is the glass vessel of mercury-vapor rectifier, 2 and 3 the anodes, 4 the mercury cathode. Disposed inside the cathode space is a cooling device 5 having the shape of a ring through which the cooling fluid is driven. Upon the cooling arrangement 5, such impurities as may form are deposited. Instead of a cooling ring, also a cooling coil or some other convenient cooling arrangement may, of course, be used. Under certain conditions also parts of the discharge vessel or container itself could be subjected to marked chilling.

Practical tests have shown that proper ignition of mercury-vapor discharge paths comprising a cooling device in accordance with the present invention can be effected even if the temperature of the cathode is as low as $-10$ degrees C.

Having thus described my invention, I am entitled to all modifications thereof that fairly fall within its spirit and scope as defined by the following claim.

I claim:—

A vapor discharge tube comprising a vessel, an anode in said vessel, a mercury cathode in said vessel, said vessel forming an enclosed path for the arc discharge between said anode and said cathode, said vessel being so formed that no part thereof is disposed so as to form an obstruction between said cathode and said anode, a hollow ring member located entirely within said vessel disposed directly over and adjacent to said cathode, said arc discharge path passing through the orifice of said ring member and means for passing a cooling fluid through said ring member.

ERNST LÜBCKE.